(12) United States Patent
DeRoo et al.

(10) Patent No.: US 6,476,811 B1
(45) Date of Patent: Nov. 5, 2002

(54) METHOD AND APPARATUS FOR COMPRESSING PARAMETER VALUES FOR PIXELS IN A DISPLAY FRAME

(75) Inventors: John E. DeRoo, Hopikton, MA (US); Steven Morein, Cambridge, MA (US); Brian Favela, Shrewsbury, MA (US); Michael T. Wright, Marlborough, MA (US)

(73) Assignee: ATI International, Srl (BB)

( * ) Notice: Subject to any disclaimer, the term of this patent is extended or adjusted under 35 U.S.C. 154(b) by 0 days.

(21) Appl. No.: 09/387,870

(22) Filed: Sep. 1, 1999

(51) Int. Cl.$^7$ ............................................. G06T 15/00
(52) U.S. Cl. ..................... 345/427; 345/419; 345/566; 345/568
(58) Field of Search ................................ 345/563, 427, 345/419, 522, 585, 586, 519, 550, 566, 568, 571, 569

(56) References Cited

U.S. PATENT DOCUMENTS

| | | | | |
|---|---|---|---|---|
| 5,121,216 A | * | 6/1992 | Chen et al. | 358/261.3 |
| 5,841,473 A | * | 11/1998 | Chui et al. | 348/390 |
| 6,049,582 A | * | 4/2000 | Navab | 378/4 |
| 6,072,505 A | * | 6/2000 | Piazza et al. | 345/501 |
| 6,285,458 B1 | * | 9/2001 | Yada | 358/1.15 |
| 6,405,136 B1 | * | 6/2002 | Li et al. | 702/10 |

* cited by examiner

Primary Examiner—Mark Zimmerman
Assistant Examiner—Mackly Monestime
(74) Attorney, Agent, or Firm—Vedder, Price, Kaufman & Kammholz

(57) ABSTRACT

A method and apparatus for compressing parameter values for pixels within a frame is accomplished by first grouping pixels in the display frame into a plurality of pixel blocks, where each pixel block includes a plurality of pixels. For at least one of the pixel blocks, the parameter values for the pixel block are translated into a column-wise differential slope representation that represents the parameter values as a plurality of reference points, a plurality of slopes, and a plurality of slope differentials. The column-wise differential slope representation is then transformed into a planar differential slope representation that reduces the representation of the plurality of reference points and the plurality of slopes to a single reference pixel value, two reference slopes, and a plurality of slope differentials. An output format representation of the planar differential slope representation is then generated, where encoding of the slope differentials allows the parameter values for the pixel block to be compressed. This compressed format representation of the parameter values can then be stored in and retrieved from memory.

38 Claims, 9 Drawing Sheets

Output Format Representation 100

Output Format Representation 120

| 3 | 8 | 13 | 18 | 23 | 28 | 33 | 38 |
|---|---|----|----|----|----|----|----|
| 4 | 9 | 14 | 19 | 24 | 29 | 34 | 39 |
| 5 | 10 | 15 | 20 | 25 | 30 | 35 | 40 |
| 6 | 11 | 16 | 21 | 26 | 31 | 36 | 41 |
| 7 | 12 | 17 | 22 | 27 | 32 | 37 | 42 |
| 8 | 13 | 18 | 23 | 28 | 33 | 38 | 43 |
| 9 | 14 | 19 | 24 | 29 | 34 | 39 | 44 |
| 10 | 15 | 20 | 25 | 30 | 35 | 40 | 45 |

Pixel Block 140

Figure 10.

| 3 | 8 | 13 | 18 | 23 | 28 | 33 | 38 |
|---|---|----|----|----|----|----|----|
| 1 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Pixel Point Values 146

Column Slopes 148

Column-wise Differential Slope Representation 150

Column Slope Differentials 144

Figure 11.

First Column-wise Differential Slope Representation 202

| P | P | P | P | P | P | P | P |
|---|---|---|---|---|---|---|---|
| S | S | S | S | S | S | S | S |
| dS | dS | dS | dS | dS | dS | dS | dS |
| dS | dS | dS | dS | dS | dS | dS | dS |
| dS | dS | dS | dS | dS | dS | dS | dS |
| dS | dS | dS | dS | dS | dS | dS | dS |
| dS | dS | dS | dS | dS | dS | dS | dS |
| dS | dS | dS | dS | dS | dS | dS | dS |

Figure 15.

Second Column-wise Differential Slope Representation 204

| dS | dS | dS | dS | dS | dS | dS | dS |
|---|---|---|---|---|---|---|---|
| dS | dS | dS | dS | dS | dS | dS | dS |
| dS | dS | dS | dS | dS | dS | dS | dS |
| dS | dS | dS | dS | dS | dS | dS | dS |
| S | S | S | S | S | S | S | S |
| P | P | P | P | P | P | P | P |

Figure 16.

Double Edge Planar Differential Slope Representation 210

- 212 — $P_u$
- 214 — $S_u$
- 216 — $dS_u$
- 218 — $dS_u$
- Breakpoint 220 — $dS_u$
- 228 — $dS_d$
- 226 — $dS_d$
- 224 — $S_d$
- 222 — $P_d$

Figure 17.

METHOD AND APPARATUS FOR COMPRESSING PARAMETER VALUES FOR PIXELS IN A DISPLAY FRAME

FIELD OF THE INVENTION

The invention relates generally to three-dimensional (3D) graphics processing and more particularly to a method and apparatus for compressing parameter values for pixels within a 3D graphics display frame.

BACKGROUND OF THE INVENTION

Computers are used in many applications. As computing systems continue to evolve, the graphical display requirements of the systems become more demanding. This is especially true in the area of three-dimensional (3D) graphics processing. In order to process 3D graphics images, the position of graphics primitives with respect to the display must be understood in all three dimensions. This includes the dimension of depth, often referred to as the Z-dimension. The Z-dimension describes the positioning of a 3D graphics primitive with respect to other 3D graphics primitives within the display frame in terms of depth, or distance from the viewer. This allows objects to be drawn in front of or behind one another in an overlapping fashion.

Computer displays and other high resolution display devices such as high definition televisions (HDTVs), projectors, printers, and the like, present an image to the viewer as an array of individual picture elements, or pixels. The individual pixels are given a specific color that corresponds to the color of the image at the location of the particular pixel. The pixels are closely spaced, and the viewer's visual system performs a filtering of the individual pixel colors to form a composite image. If the partitioning of the image into the individual pixel elements is performed properly, and the pixels are close enough together, the viewer perceives the displayed array of pixels as a virtually continuous image.

In order to present a smooth and continuous image on the display, the processing entity processing the 3D graphics images must maintain a high rate of pixel processing. In order to achieve high rates of pixel processing, pixel data stored in display memory must be retrieved, processed, and then stored back in the memory in an efficient manner. In order to achieve very high pixel processing rates, a large amount of memory bandwidth is required. This is because as new pixel fragments are received, at least the already existing Z component of pixels stored in a display frame must be retrieved and compared with the fragment to generate an updated image. The resulting set of information for each altered pixel must then be stored back into memory.

As the resolution, or number of pixels in a designated area, of the display increase, the memory bandwidth requirements to maintain the displayed image also increases. More memory bandwidth requirements translate into increased costs. This can be due to the requirement for faster, more expensive memories whose speed provides the needed bandwidth, or through multiple memories that can operate in parallel. Parallel memory structures are undesirable as they add complexity to the system and increase costs of manufacturing 3D graphics processing systems.

Therefore, a need exists for a method and apparatus for reducing the memory bandwidth requirements in a 3D graphics system.

BRIEF DESCRIPTION OF THE DRAWINGS

FIG. 10 illustrates a block diagram of a pixel block and the corresponding pixel parameter values in accordance with the present invention;

FIG. 11 illustrates a column-wise differential slope representation of the parameter values of the pixel block of FIG. 10;

FIG. 15 illustrates a block diagram of a first column-wise differential slope representation of a pixel block that corresponds to the method illustrated in FIG. 14;

FIG. 16 illustrates a second column-wise differential slope representation that also corresponds to the method illustrated in FIG. 14; and FIG. 17 illustrates a portion of a double edged planar differential slope representation of a pixel block in accordance with the method illustrated in FIG. 14.

DETAILED DESCRIPTION OF A PREFERRED EMBODIMENT OF THE INVENTION

Generally, the present invention provides a method and apparatus for compressing parameter values for pixels within a frame, where the parameter values may include the values of the Z parameter for each pixel within the frame. This is accomplished by grouping pixels in the display frame into a plurality of pixel blocks, where each pixel block includes a plurality of pixels. For at least one of the pixel blocks, the parameter values for the pixel block are translated into a column-wise differential slope representation that represents the parameter values as a plurality of reference points, a plurality of slopes, and a plurality of slope differentials. The column-wise differential slope representation is then transformed into a planar differential slope representation that reduces the representation of the plurality of reference points and the plurality of slopes to a single reference pixel value, two reference slopes, and a plurality of slope differentials. An output format representation of the planar differential slope representation is then generated, where encoding of the slope differentials allows the parameter values for the pixel block to be greatly compressed in most instances. This compressed format representation of the parameter values can then be stored and retrieved from memory in a manner that greatly reduces the memory bandwidth requirements for performing three-dimensional 3D graphics processing.

Figure 1:
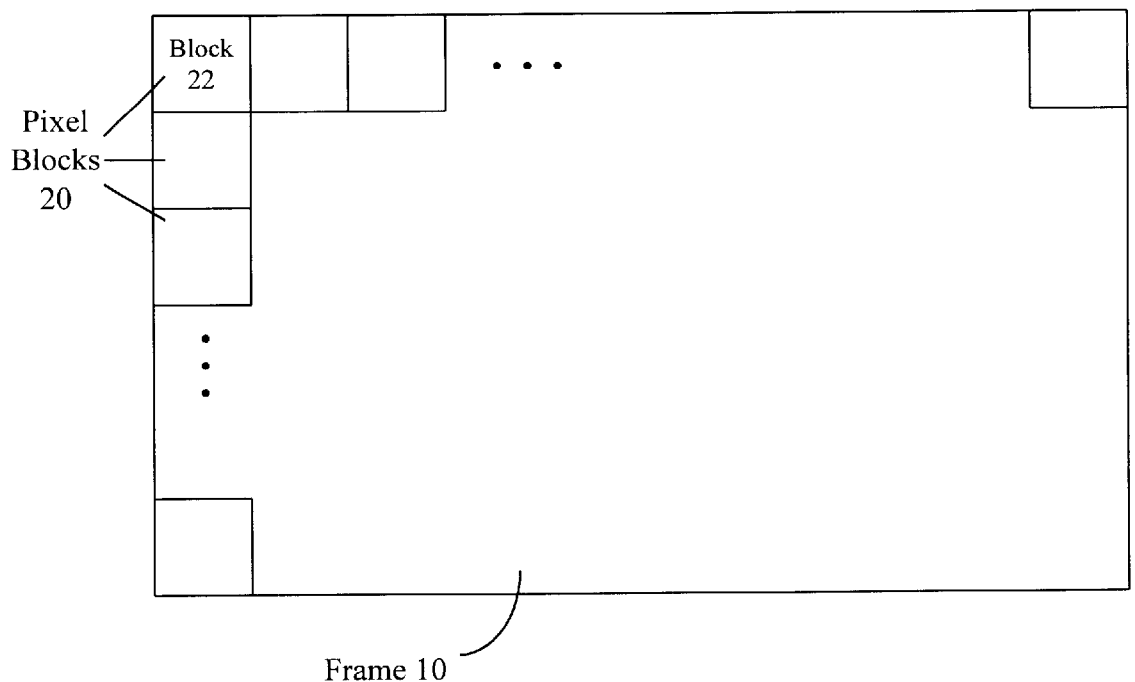
FIG. 1 illustrates a block diagram of a display frame divided into a plurality of pixel blocks in accordance with the present invention.

The invention can be better understood with reference to FIGS. 1–17. FIG. 1 illustrates a display frame 10 that is broken up into a plurality of pixel blocks 20, where the plurality of pixel blocks 20 includes pixel block 22. The pixels in the display frame are grouped into the pixel blocks to facilitate parameter compression. Within the display frame 10, objects for display are represented by a number of 3D graphics primitives. Preferably, these 3D graphics primitives are polygonal primitives, and may be triangle primitives, which are commonly used in 3D graphics systems. The size of the pixel blocks 20 is chosen based on the typical size of a primitive used for generation of an object in the display frame 10. Preferably, the size of the pixel blocks 20 is chosen such that the majority of the pixel blocks will fall entirely within a particular graphics primitive within the display frame 10. In one embodiment, each of the pixel blocks 20 is an 8 pixel by 8 pixel block. In such an embodiment each pixel block would include 64 pixels. Although the number of pixels included within each of the blocks can vary, the 8-by-8 example will be used throughout the remainder of the specification to aid in illustration of the invention. It should be noted that the block configuration used does not require a square block, and, for example, an 8-by-16 rectangular block could be utilized.

Figure 2:
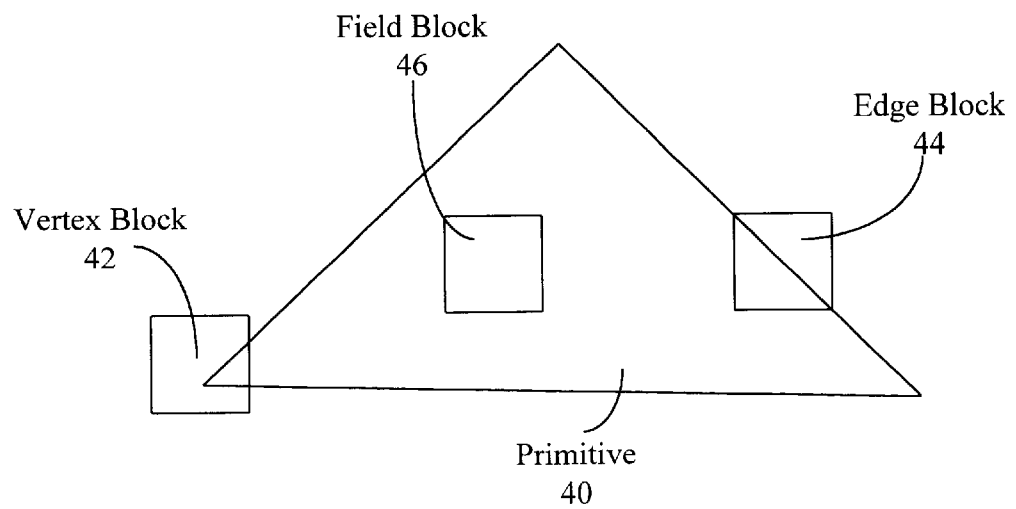
FIG. 2 illustrates a block diagram of a primitive and various pixel blocks that include pixel information corresponding to the primitive in accordance with the present invention.

FIG. 2 illustrates a triangle primitive 40. Three different types of pixel blocks are illustrated in conjunction with the primitive 40. The field block 46 is a pixel block that falls completely within the primitive 40. The edge block 44 is a pixel block that lies along one edge of the primitive 40 and preferably also lies along the edge of another primitive such that the edge block 44 represents the intersection of two primitives along a common dividing line. The vertex block 42 includes one of the vertices of the primitive 40, and likely intersects multiple primitives. As is apparent to those of ordinary skill in the art, if the primitive is small enough in comparison to the block size utilized, multiple vertices or all of the vertices for the primitive may be included in the same block.

The invention described herein exploits the fact that field blocks, such as field block 46, will comprise the majority of the pixel blocks within a particular display frame. All of the pixels within a field block will have Z coordinate values that lie in the same plane, which corresponds to the plane along which the primitive lies. Exploiting this planar association between the various Z coordinate values of the field blocks in the frame allows the majority of the parameter values for a field block to be represented with a greatly reduced number of bits than would be required to represent each pixel individually. The compression can be performed in a lossless manner that allows all of the particular Z coordinate values for each of the pixels within a pixel block to be fully recovered when the compressed data set for the pixel block is uncompressed.

Figure 3:
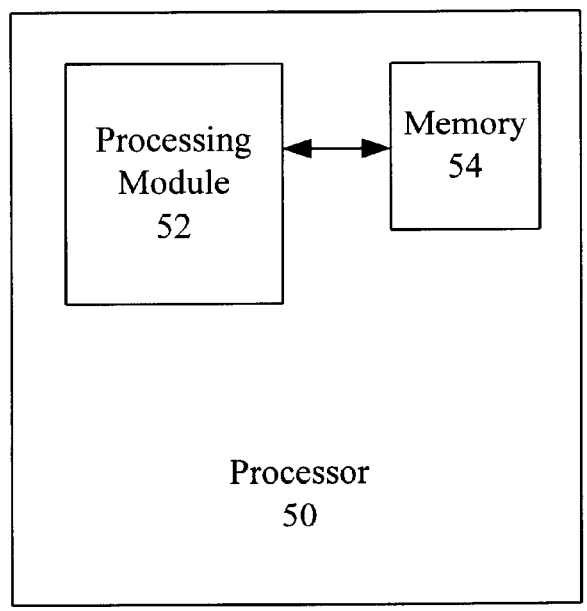
FIG. 3 illustrates a block diagram of a pixel parameter compression processor in accordance with the present invention.
Figure 4:
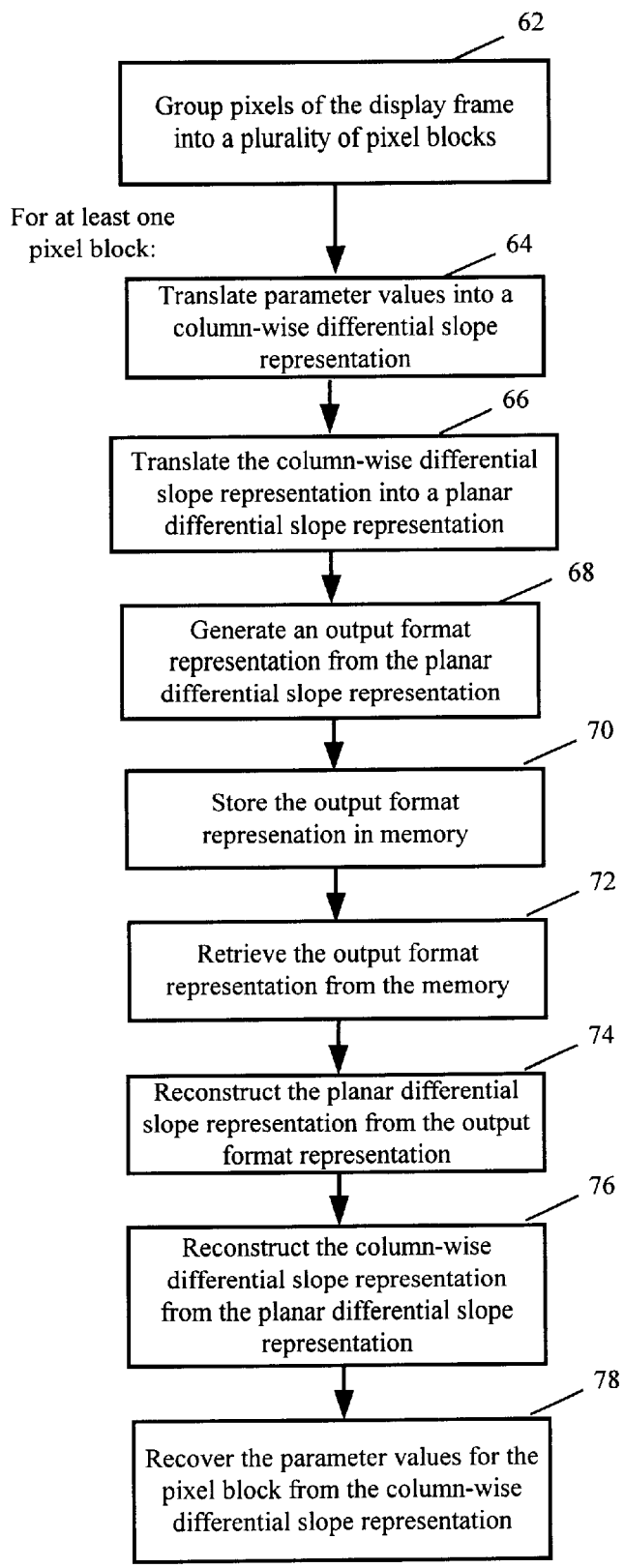
FIG. 4 illustrates a flow diagram of a method for compressing parameter values for pixels in a display frame in accordance with the present invention.
Figure 14:
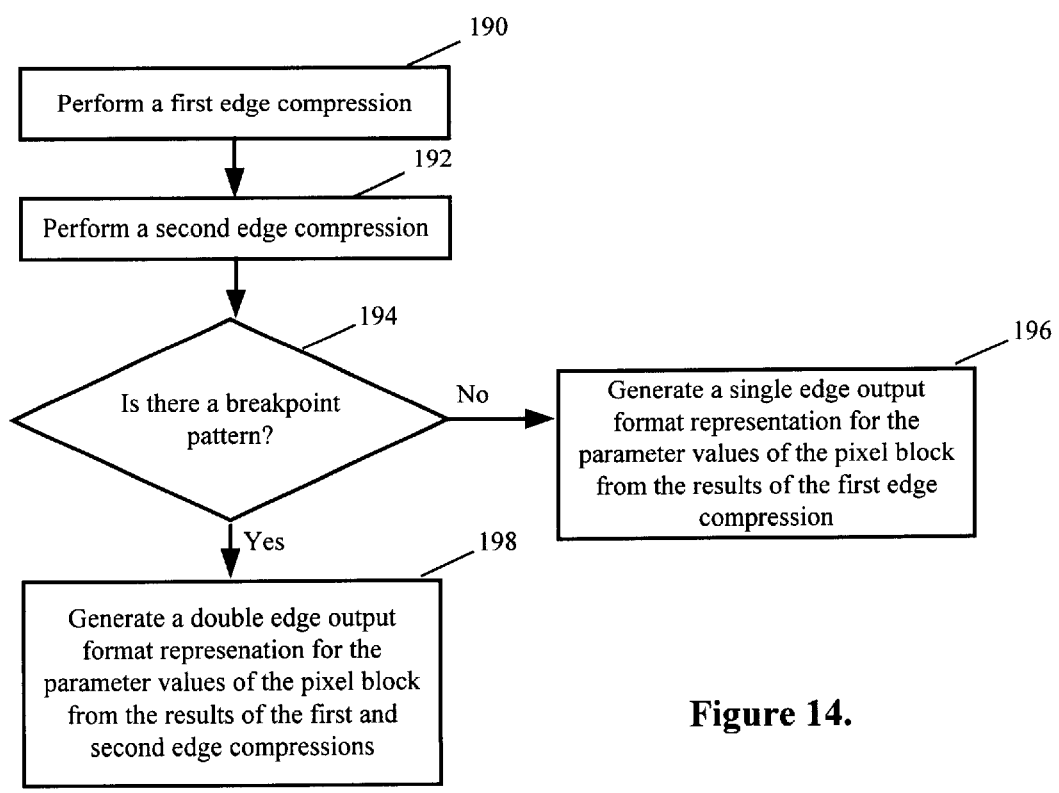
FIG. 14 illustrates a flow diagram of an alternate method for compressing parameter values of a pixel block in accordance with the present invention.

FIG. 3 illustrates a compression processor that can be used in conjunction with the methods illustrated in FIG. 4 and FIG. 14. Note that the methods of FIGS. 4 and 14 could be performed without the use of a compression processor as illustrated. The pixel parameter compression processor 50 of FIG. 3 includes a processing module 52 and memory 54. The processing module may include a single processing entity or a plurality of processing entities. Such a processing entity may be microprocessor, microcontroller, digital signal processor, state machine, logic circuitry, and/or any device that processes information based on operational and/or programming instructions.

The memory 54 may be a single memory device or a plurality of memory devices. Such a memory device may be a read only memory device, random access memory device, floppy disk, hard drive memory, and/or any device that stores digital information. Note that when the processing module 52 has one or more of its functions performed by a state machine and/or logic circuitry, the memory containing the corresponding operational instructions is embedded within the state machine and/or logic circuitry. The memory 54 stores programming and/or operating instructions that, when executed, allow the processing module 52 to perform at least one of the methods illustrated in FIGS. 4 and 14. Note that the processor 50 may implement some of the functions of these methods through software stored in the memory 54, whereas other portions may be implemented using hardware, or circuitry included within the processor 50. Thus, in some embodiments a mix of hardware and software may be used to perform the methods of FIGS. 4 and 14.

FIG. 4 illustrates a flow diagram of a method for compressing the parameter values for pixels within a display frame such that memory bandwidth requirements can be reduced. Preferably, the parameter values being compressed are the Z coordinate parameter values for the pixels in the display frame. However, it should be apparent to one of ordinary skill in the art that other parameter values for the pixels may be compressed in a similar manner. In order for other parameter values to be compressed, the relationship between the parameter values within a primitive should be a relatively planar relationship, such as that which exists for the Z values for various pixels within a primitive.

The method of FIG. 4 begins at step 62 where pixels of the display frame are grouped into a plurality of pixel blocks. Preferably, this pixel grouping is performed such that the majority of the pixel blocks within the display frame will be field blocks such that they will be included within a single primitive. Once the grouping has been performed at step 62, the steps 64–68 are performed for at least one pixel block, and preferably for all of the pixel blocks within the display frame. Step 64–78 correspond to the compression storage and decompression of a single pixel block, and may be repeated for multiple pixel blocks within the frame.

Figure 5:
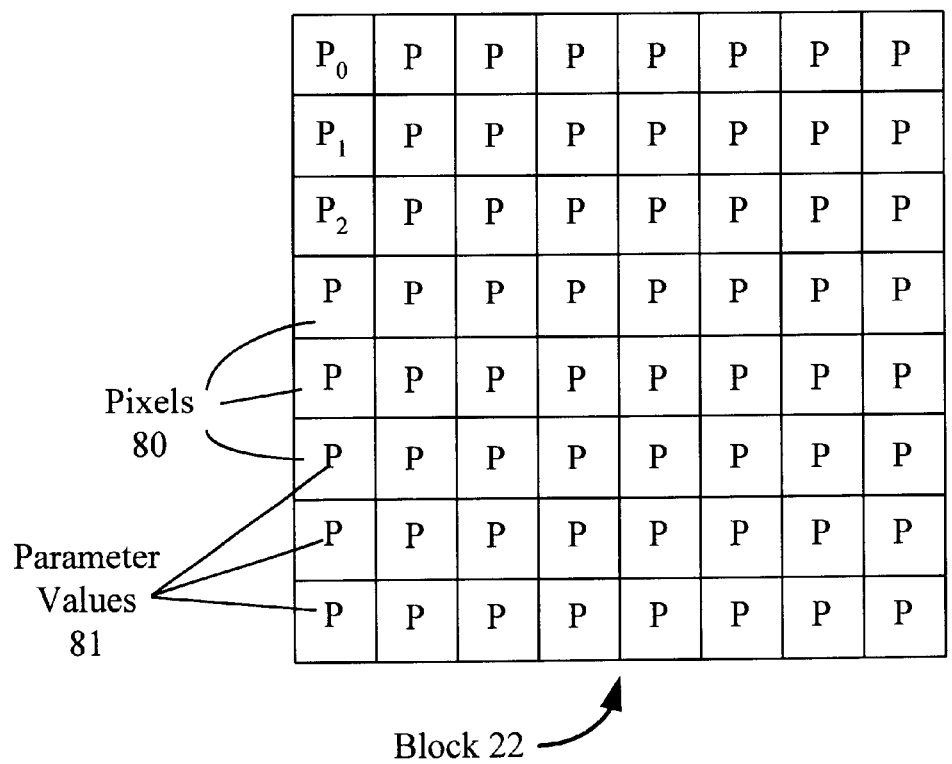
FIG. 5 illustrates a pixel block that includes a plurality of pixels having a plurality of parameter values in accordance with the present invention.

FIG. 5 illustrates a particular pixel block 22 that includes a plurality of pixels 80 each of which has a pixel parameter value 81. Thus, each of the "P" characters indicates a pixel parameter value at that particular pixel location. In one embodiment, where the parameter values are Z coordinate parameter values for the pixels, the Z coordinate parameter values may be represented by two 16-bit words such that 32 bits are required to represent each of the parameter values 81 within the block 22. In such an embodiment, 2,048 bits would be required to store the Z values for all of the pixels in the block 22.

The compression begins at step 64, where the parameter values for the pixels included in the pixel block are translated into a column-wise differential slope representation.

Figure 6:
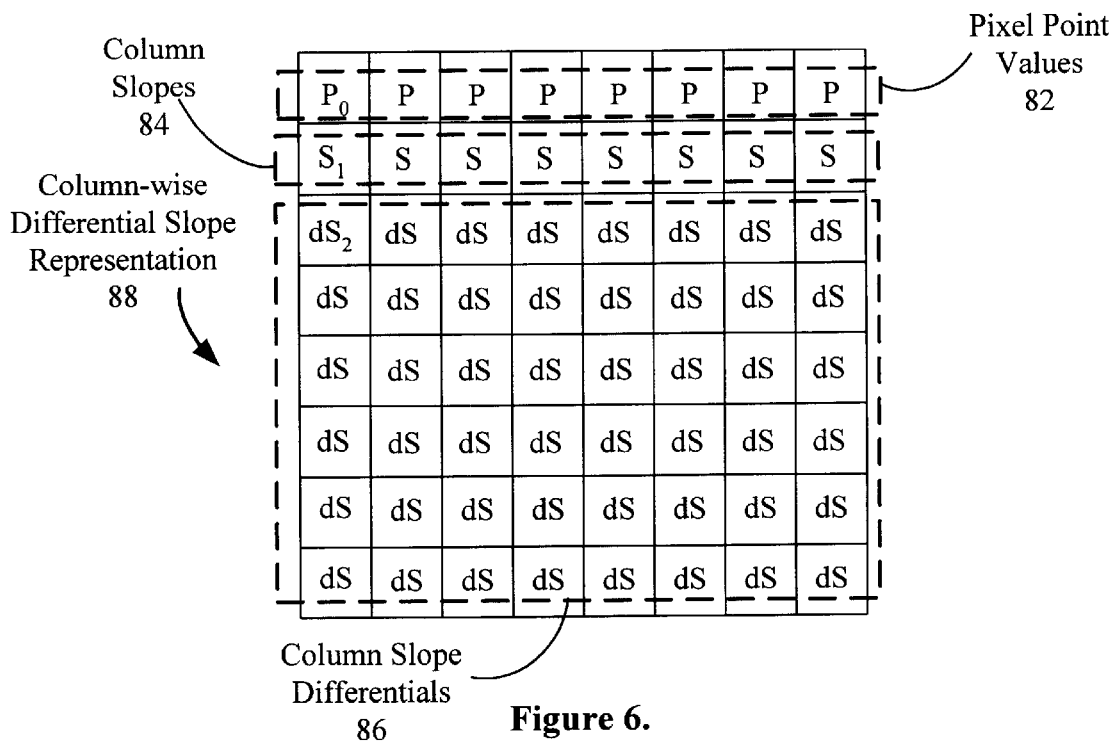
FIG. 6 illustrates a block diagram of a column-wise differential slope representation of the pixel block parameters of FIG. 5.

FIG. 6 represents the column-wise differential slope representation 88 of the parameter values for the pixel block 22. The column-wise differential slope representation 88 includes a plurality of pixel point values 82, a plurality of column slopes 84, and a plurality of column slope differentials 86. The pixel point values 82 correspond to the parameter values for the pixels that are preferably located along one edge of the pixel block. Note that the orientation of the pixel block can be altered such that the row of pixel point values, which is shown to be the top row of the pixel block in FIG. 6, can be positioned along the bottom row, or along the left most or right most columns.

The column slopes 84 represent the slope of the parameter value along each of the columns. Within each column, the column slope can be calculated by simply subtracting the parameter value in the second row from the parameter value in the first row. Thus, if the first row has a parameter value $P_0$, and the parameter value in the second row has a value $P_1$, the column slope in that column is equal to $P_1$ minus $P_0$.

Each of the column slope differentials 86 is calculated to indicate the deviation from the current slope of the parameter at that point along the column. Thus, the differential slope ($dS_2$) will be the difference between the slope of the parameter value between pixel points $P_0$ and $P_1$ and the slope between pixel points $P_1$ and $P_2$. The equation for calculating the value of $dS_2$ is:

$$dS_{(2)} = (P_2 - P_1) - (P_1 - P_0)$$

Similarly, the differential slopes for the remaining pixel locations within the pixel block can be calculated using the formula:

$$dS_{(N)} = (P_N - P_{N-1}) - (P_{N-1} - P_{N-2}).$$

It should be noted that this formula is used along each column within the block. The values for each column within the column-wise differential slope representation 88 are computed independently of the values within other columns. It should be noted that rather than calculating a column-wise differential slope representation, the same principle can be applied on a row-by-row basis rather than a column-by-column basis to achieve similar results with a different orientation.

Figure 7:
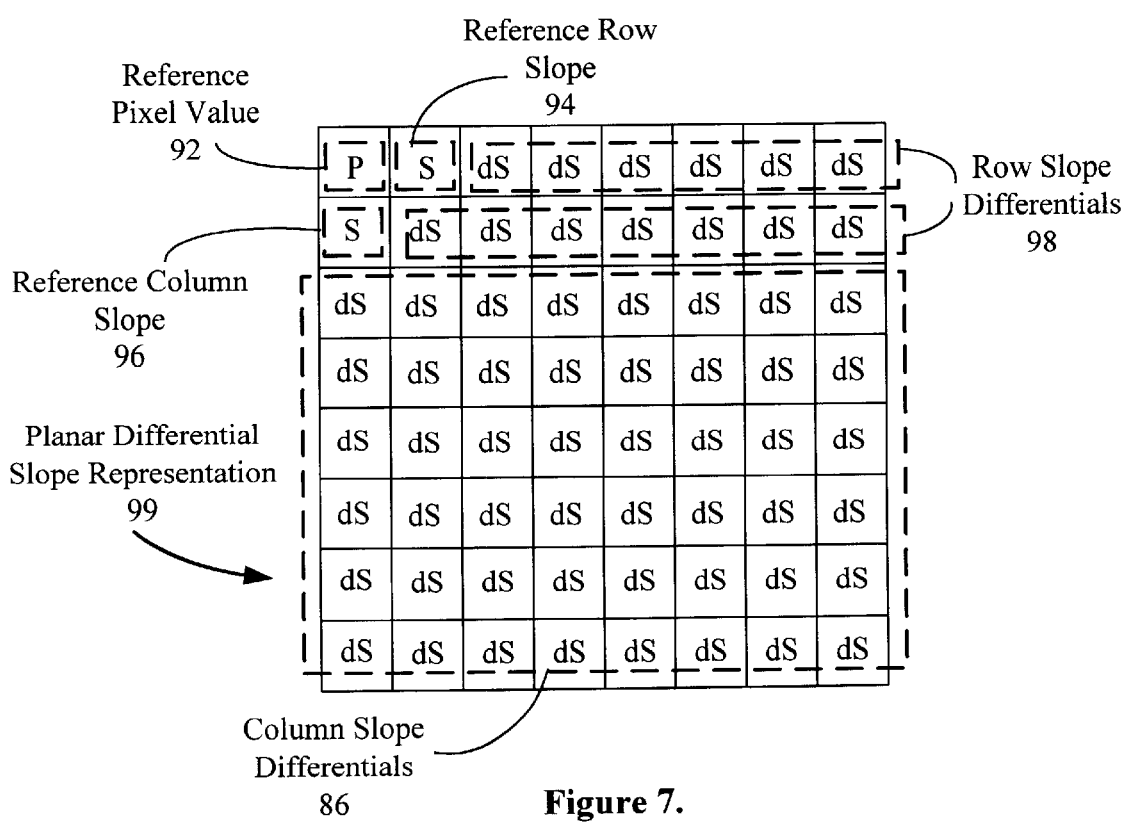
FIG. 7 illustrates a planar differential slope representation of the pixel block parameters of FIG. 5.

Continuing with the flow diagram of FIG. 4, at step 66, the column-wise differential slope representation is translated into a planar differential slope representation. The planar differential slope representation 99 resulting from the translation of the column-wise differential slope representation 88 is illustrated in FIG. 7. This can be seen, the planar differential slope representation 99 reduces the plurality of pixel point values 82 and the plurality of column slopes 84 of the column-wise differential slope representation 88 to a reference pixel value 92, a reference row slope 94, a reference column slope 96, and a plurality of row slope differentials 98.

The planar differential slope representation takes further advantage of the correlation between the parameter values within the pixel block and further simplifies the representation of the pixel point values 82 and the column slopes 84 of the column-wise differential slope representation 88. Essentially, the same principle applied to the columns to achieve the column-wise differential slope representation 88 is applied to the first two rows of the column-wise differential slope representation 88 to generate the planar differential slope representation 99. Note that the column slope differentials 86 calculated for inclusion in the column-wise differential slope representation 88 remain unchanged in the planar differential slope representation 99. The reference row slope 94 allows the pixel point values 82 to be compressed into a line of row slope differentials.

The regularity of parameter values within the pixel block is also used to reduce the column slopes 84 in the second row to a single reference column slope 96 and the remaining row slope differentials that are generated based on the reference column slope 96. The differential slope located in the second row and second column is calculated by subtracting the slope at that pixel location from the reference column slope 96. The differential slope in the second row and third column is calculated by subtracting the slope at that pixel location from the slope at the second row and second column, and so on.

Figure 8:
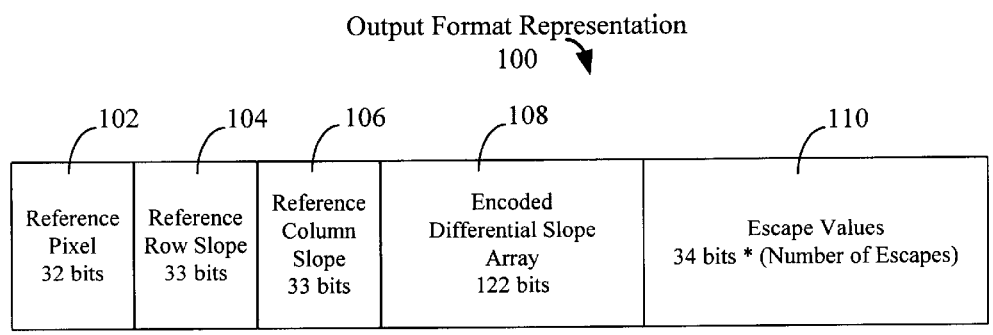
FIG. 8 illustrates a block diagram of an output format representation of the parameter values for a pixel block in accordance with the present invention.

Continuing with the method of FIG. 4, at step 68, an output format representation is generated from the planar differential slope representation. The output format representation 100 used in one embodiment is illustrated in FIG. 8. Using the example where each parameter value at each pixel location is represented using 32 bits, the value at the reference pixel 102 can be represented with 32 bits. The reference row slope 104 and the reference column slope 106 require 33 bits as these slopes are signed slopes such that an additional bit is required to indicate a positive or negative slope.

The compression is achieved in the encoding of the differential slopes within the output format representation 100. Because of the high correlation between pixel parameter values (Z values in one embodiment) within the pixel blocks, the differential slopes will typically be very small values. In most cases, the differential slopes will have an integer value that ranges from −1 to 1. The differential slopes result from the discretization of the Z values. An encoding scheme can thus be used where a −1 is represented with one two-bit value, a 0 is represented as a second two-bit value, and a 1 is indicated as a third two-bit value. The final two-bit value available in a two-bit encoding set can then be used to encode an escape. An escape indicates that the value of the differential slope at a particular location is outside of the range of the encoding bits. Thus, any differential slope that is greater than 1 or less than −1 will be encoded with an escape value. In a simple example, a 0 could be encoded as "00" a −1 could be encoded as "10", a 1 could be encoded as "01", and finally the escape value could be encoded as "11".

It should be noted that the number of encoding bits used to encode the column and row slope differentials in the output format representation could be more or less than two bits. In a one-bit example, one value might be used to encode a 0 differential slope, whereas the other value indicates an escape. Similarly, using three encoding bits allows for a larger encoding range, thus possibly making fewer escapes necessary. Assuming that two bits are used to encode each differential slope, the encoded differential slope array 108 within the output format representation 100 would require 122 bits. Note that the ordering of the differential slopes within the encoded differential slope array is preferably predetermined such that reversing the compression process is straightforward.

Any escape values required to encode the values of differential slopes within the pixel block must also be included in the output format representation 100. Because each escape value results from a calculation that includes four 32-bit quantities, 34 bits may be required to represent an escape value. Thus, the escape values 110 included in the output format representation 100 will require 34 bits times the number of escapes required in the pixel block to which the output format representation 100 corresponds. The ordering of the escape values 110 within the output format representation 100 should correspond in some way to the ordering of the differential slopes in the encoded differential slope array 108 such that decompression of the output format representation 100 is straightforward. It should be noted that the ordering of the various portions of the output format representation 100 may vary based on specific implementation.

In the best-case scenario where no escape values are required for a particular pixel block, the output format representation 100 can allow the 2,048 bits required in the example to store the uncompressed parameter values for all of the pixels within the pixel block to be reduced to the 220 bits required to store the compressed version. Performing such compression of the parameter values can allow a system to transfer these values to a memory structure using far less bandwidth than would be required in an uncompressed format. In addition, the compression may also reduce the memory storage space required to store the parameter values. Because the compression is lossless, the parameter values are fully recoverable from the compressed format.

Figure 9:
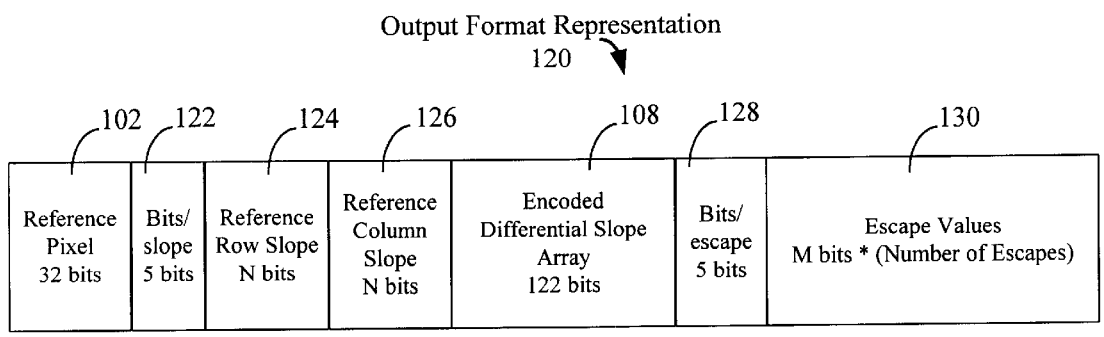
FIG. 9 illustrates a block diagram of an alternate output format representation of the parameter values of a pixel block in accordance with the present invention.

FIG. 9 illustrates an output format representation 120 that can be used in another embodiment of the invention to further reduce the number of bits required to store the parameter values for a pixel block. As is the case with the output format representation 100, the output format representation 120 stores the reference pixel 102 and the encoded differential slope array 108. One difference between the output format representation 120 and the output format representation 100 is in that the escape values 130 may be stored using fewer than 34 bits. Preferably, the maximum number of bits required to store the largest, or most bit-consuming escape value determines the number of bits used to store each of the escaped values 130. Thus, M bits may be used to store each of the escape values, where M bits is the minimum number of bits required to fully encode each of the escape values in a lossless manner. In order for decompression of the output format representation 120 to occur, the number of bits used to store each of the escaped values must be indicated within the output format representation 120. Thus, the configuration bits 128 that indicate the number of bits-per-escape are encoded within the output format representation 120. Because each escape value will require a minimum of two bits, five bits is adequate to encode a range between 2 and 34 bits.

Another difference between the output format representation 120 and the output format representation 100 is that the reference row slope 124 and the reference column slope 126 may be represented with fewer than 33 bits. In many instances, the reference row slope and reference column slope will be relatively small. Thus, N bits could be used to represent both the reference row slope 124 and the reference column slope 126, where N is the minimum number of bits required to encode each of the reference row slope and the reference column slope in a lossless manner. Once again, the configuration bits 122 that indicate the number of bits-per-slope must be included in the output format representation in order to allow decompression. As was the case with the escape values, five bits is adequate to encode the number of bits, N, used to encode the reference slopes.

It should be noted that the optimizations in terms of reducing the number of bits used to store escape values or reference slopes may or may not be included in various embodiments of the invention. Thus, in one embodiment only the optimization for escape values may be utilized, in another embodiment only the optimization for row and column reference slopes may be utilized, and in yet another embodiment, both optimizations may be employed.

Returning to FIG. 4, at step 70 the output format representation is stored in memory. Because the number of bits required to encode the parameter values for all of the pixels within a pixel block has been greatly reduced, the memory bandwidth required to store the output format representation is much less than would be required to store an uncompressed set of parameter values. In addition to this, the amount of memory required to store the parameter values is reduced. A similar reduction in memory bandwidth is realized when the output format representation is retrieved from the memory at step 72. Once the output format representation has been retrieved, the parameter values for each of the pixels is recovered from the output format representation.

The recovery of the parameter values begins at step 74 where the planar differential slope representation is reconstructed from the output format representation. Because ordering of the portions of the output format representation is known, the reconstruction of the planar differential slope representation is straightforward. At step 76, the column-wise differential slope representation is reconstructed based on the planar differential slope representation. Once this has been achieved, the parameter values for the pixel block can be recovered by computing the parameter values based on the pixel point values, column slopes, and column slope differentials at step 78.

Figure 12:
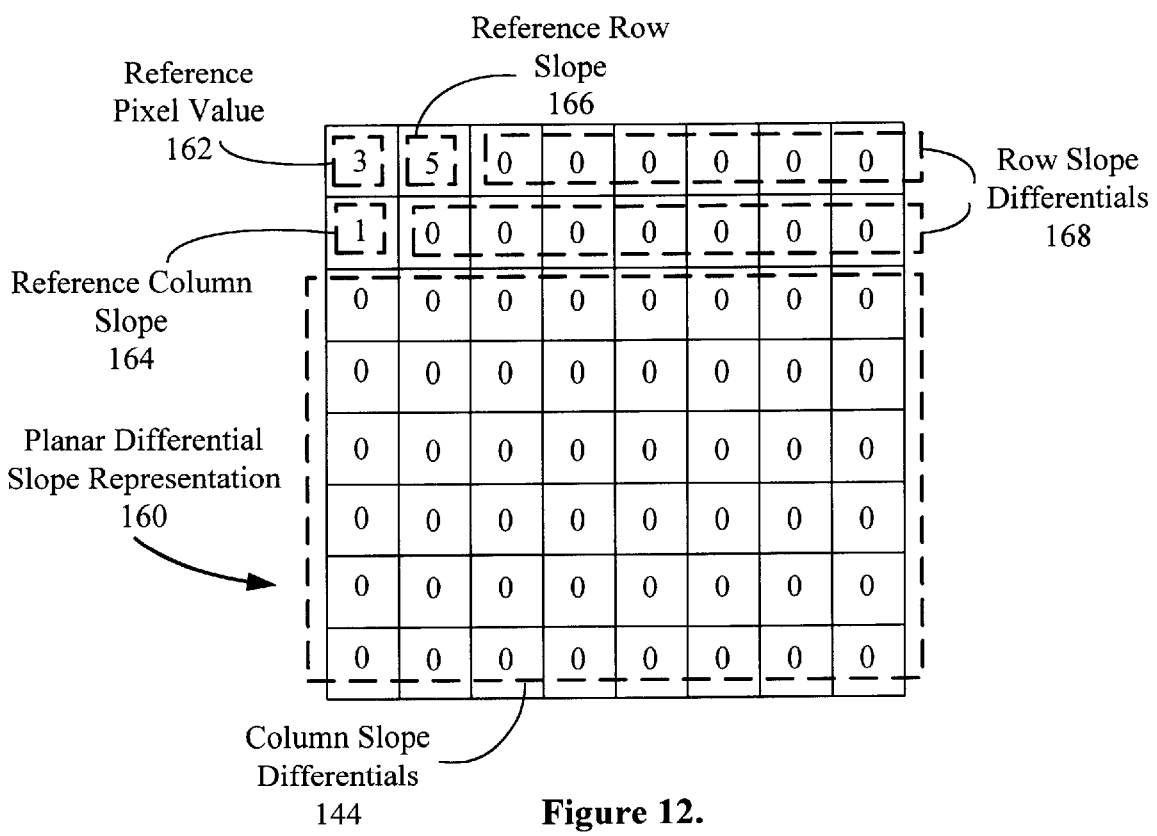
FIG. 12 illustrates a block diagram of a planar differential slope representation of the parameter values of the pixel block of FIG. 10.

FIGS. 10–12 illustrate an example using actual pixel parameter values that can aide in the understanding of portions of the method of FIG. 4. FIG. 10 illustrates a pixel block 140, where the numbers at each pixel location represent the Z value, or some other pixel parameter value, corresponding to each pixel within the pixel block 140. The pixel block 140 is assumed to be a field pixel block such that the entire pixel block 140 is included within a single graphics primitive. As such, there is a strong correlation amongst the parameter values across the entire pixel block.

FIG. 11 illustrates the column-wise differential slope representation 150 that results from the translation of pixel block 140. The column-wise differential slope representation 150 includes a plurality of pixel point values 146, which are the parameter values for the pixels located in the top row. As described earlier, each of the column slopes 148 is calculated by subtracting the parameter value of the pixel in the second row from the parameter value of the pixel in the first row. As can be seen, the slope of the parameter along each column of the example pixel block is 1. This should be apparent from the illustration in FIG. 10.

Each of the column slope differentials 144 indicates whether or not any of the Z values at these locations deviate from the slope along their respective column. In the simple case illustrated, all of these column slope differentials 144 are zero. This indicates that the resolution with which the slope has been computed for each column is adequate and that no deviation from the slope exists within the pixel block.

The column-wise differential slope representation 150 of FIG. 11 is then transformed into the planar differential slope representation 160 illustrated in FIG. 12. As can be seen, the column slope differentials 144 remain unchanged. The row of pixel point values 146 of FIG. 11 is transformed into a single reference pixel value 162, a reference row slope 166, and the top row of the row slope differentials 168. The reference row slope 166 is calculated by subtracting the pixel point value in the second column from the pixel point value in the first column. The slope in this case is calculated to be equal to 5. As such, the slope of 5 is maintained across the entire set of columns, and thus the row slope differentials included in the first row are shown to be 0.

The row of column slopes 148 of FIG. 11 can be reduced in a similar manner. The slope contained in the second column is subtracted from the slope in the first column to determine the value of the differential slope. Because all of the column slopes 148 were shown to be equal to 1, the row slope differentials in the second row are shown to be 0.

Compiling the values included in the planar differential slope representation 160 of FIG. 12 into an output format representation is then a simple task that greatly reduces the number of bits required to encode the Z values for the pixel block 140 in a lossless manner. Compressing the Z values and any other similar values corresponding to pixel blocks in a 3D graphics system can allow the 3D graphics system to operate using much less memory bandwidth. This in turn can allow for a less expensive system that is still able to maintain high pixel processing rates.

Figure 13:
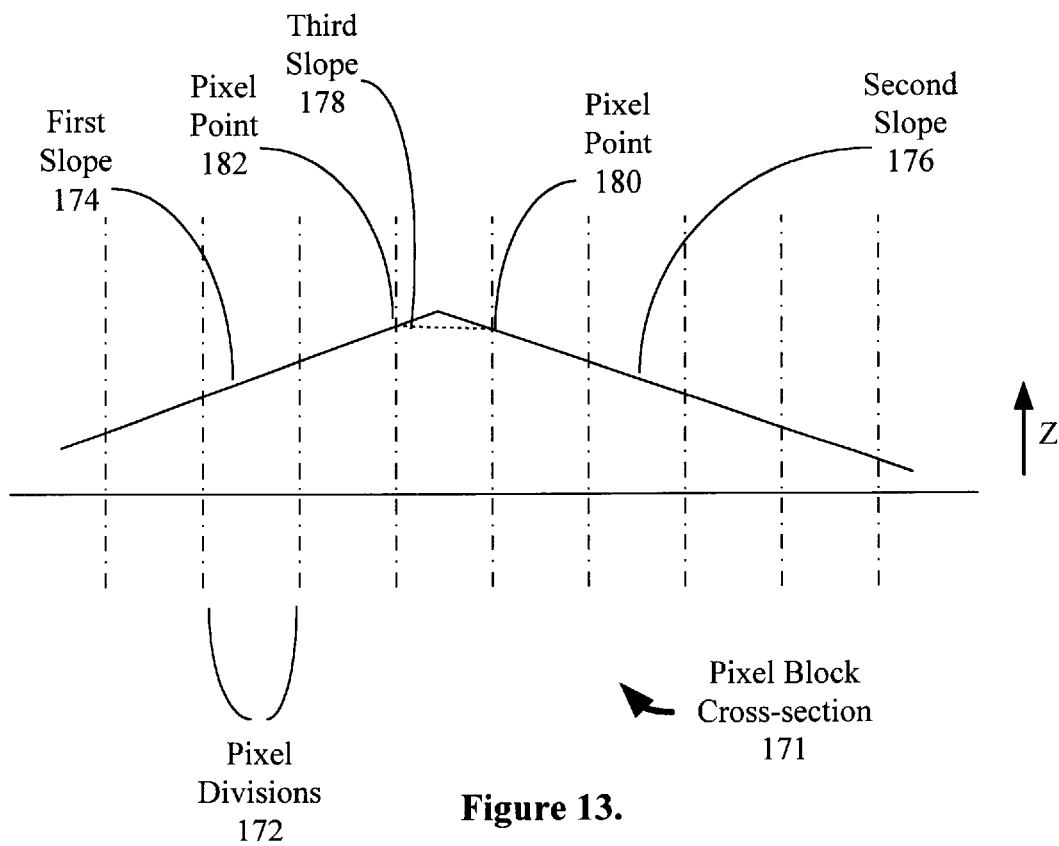
FIG. 13 illustrates a cross sectional view of a pixel block that includes two intersecting primitives in accordance with the present invention.

The example illustrated in FIGS. 10–12 was a simple example of compression of a field block that is completely included within a single primitive. The example is further simplified as it does not include any slope deviations (−1 and 1 values) that are typically present in actual field blocks encountered in practice. A more difficult and complex example exists for an edge block, which, as described earlier, lies along the intersection of two primitives. FIG. 13 illustrates a pixel block cross-section 171 where the pixel block shown has two primitives intersecting approximately in the middle of the pixel block. The view provided shows the primitives as lines where one primitive has a first slope 174 and the other primitive has a second slope 176. If the line having the first slope 174 is followed starting on the left side, the slope will be maintained up until the intersection point, at which point the slope will change. The new slope is then maintained until the right most portion of the pixel block is reached. On a pixel-by-pixel basis, the differential slope will be zero up until the fourth pixel from the left. At this point, a third slope 178 will be determined. This third slope is an anomaly that corresponds to the slope between the pixel points 182 and 180.

The changes in slope within the pixel block would result in two escape values being included along each row or column (depending on the orientation) of the pixel output representation of the pixel block. However, if the pixel block is approached with reference pixels at both ends of the pixel block, then the slope differences will be zero along each of the first and second slopes 174 and 176 up to the point of intersection. This is because the slope along each line is constant up until the intersection point. Exploiting this symmetry can reduce the number of bits required in the output format representation in comparison to the number of bits required with the inclusion of two escape values per row or column. Another common situation where this technique proves useful is for two primitives that do not actually intersect, but which lie in different planes where one plane lies completely in front of the other. Such a situation is often found at the edge of objects included in the display.

FIG. 17 illustrates a portion of a double edge planar differential slope representation 210. The break point 220 indicates the point at which the reference pixel to which the differential slope are referenced switches between that in the top left corner, $P_u$ 212 and that in the lower left hand corner, $P_d$ 222. The slope 214 and the differential slopes 216 and 218 are calculated using the reference pixel 212, whereas the slope 224 and the differential slopes 226 and 228 are calculated using the reference pixel 222. In order to decompress the double edge planar differential slope representation 210, the break point with respect to each column must be included in the output format representation. Although this adds some additional overhead, in some cases it can be very beneficial in reducing the number of escape values required in the output representation. The reduction in escape values is typically advantageous enough to justify the inclusion of an additional reference pixel value and two additional reference slopes corresponding to the additional reference pixel value.

FIG. 14 illustrates a method that can be employed to utilize the double edge compression technique in the compression of a particular pixel block. The method begins at step 190 where a first edge compression is performed. The first edge compression is preferably performed as was described with respect to steps 64 and 66 of FIG. 4 such that a column-wise and planar differential slope representation are generated based on a reference pixel. At step 192, a second edge compression is performed, where the second edge compression utilizes a reference pixel located in a corner orthogonally opposite the reference pixel of the first edge compression. FIGS. 15 and 16 illustrate column-wise differential slope representations 202 and 204 corresponding to the first and second edge compressions. The reference pixel for the second column-wise differential slope representation 204 is preferably in the lower left hand corner. Thus, the second edge compression is similar to the first edge compression with the only difference being that it utilizes a different reference pixel within the pixel block. In addition to this, the second edge compression may be a partial edge compression. This is because if a double edge output representation is utilized, the first two rows will be described based on the reference pixel of the first edge compression, and therefore the differential slopes for these rows do not need to be calculated in the performance of the second edge compression.

At step 194 it is determined whether or not there is a predetermined breakpoint pattern within one of the first and second pluralities of column slope differentials corresponding to the first and second edge compressions. The breakpoint pattern is recognized as a point within the differential slopes where a slope-discontinuity takes place. Thus, the breakpoint 220 of FIG. 17 indicates the point at which the slope along the column changes direction significantly. If no breakpoint pattern is detected at step 194, the method proceeds to step 196 where a single edge output format representation of the parameter values for the pixel block is generated from the results of the first edge compression. The single edge output format representation will include the first reference pixel, the first reference column slope, the first reference row slope, the first plurality of row slope differentials, and the first plurality of column slope differentials corresponding to the first edge compression in a predetermined single edge order. The representation is preferably as was described with respect to FIGS. 8 and 9.

If it is determined at step 194 that there is a breakpoint pattern, the method proceeds to step 198 where a double edge output format representation is generated for the parameter values of the pixel block based on the results of the first and second edge compressions. The double edge output format representation orders the first and second reference pixel values, the first and second reference row slopes, the first and second reference column slopes, portions of each of the first and second pluralities of row slope differentials, portions of the first and second pluralities of column slope differentials, and a breakpoint indication for each column (or row depending on the choice of reference pixels) in a predetermined double edge order. The portions of the first and second pluralities of column and slope differentials included in the double edge output format representation are based on location of the predetermined breakpoint pattern in the pixel block. The breakpoint indication describes the portions of the first and second pluralities of column and slope differentials that are included in the double edge output representation.

Preferably, the single and double edge output format representations also include an indication as to whether the compression for the pixel block is single edge compression or double edge compression. A single bit could be included to make this determination. Representation of the various differential slopes and escape values is preferably accomplished within the single and double edge output format representations in the same manner as was described with respect to FIGS. 8 and 9. Thus, the two-bit encoding system described for the differential slopes in a single edge compression technique can easily be applied to the double edge compression technique along with the escape value and row and column slope value optimizations discussed.

The method of FIG. 14 can be modified in order to avoid any unnecessary processing. Preferably, the first and second edge compressions are performed in parallel such that the determination as to the existence of a breakpoint pattern can be based on either of the first or second edge compressions, as both will indicate the predetermined breakpoint pattern within their differential slope fields. However, it may be preferable to perform only a portion of the first edge compression such that when the first column-wise differential slope representation is generated, it can then be examined to determine whether single or double edge compression is appropriate for the particular pixel block. When such a method is employed, the detection of the breakpoint pattern can occur earlier in the method, and when single edge compression is to be used to compress a pixel block, the performance of any portion of the second edge compression can be avoided.

The compression technique for the parameter values of the pixel blocks within a display frame described herein can greatly reduce the bandwidth requirements for storing and retrieving the parameter values from memory. Note that the compression also reduces the amount of memory space required to store the parameter values for a particular pixel block when compression is successful.

It should be noted that in some cases compression of a particular pixel block may not be advantageous in that the resulting output format representation is in fact larger in terms of its number of bits then would be required to store the parameter values in an uncompressed state. Based on this, systems employing the compression technique described herein preferably make a determination as to whether compression is truly possible with respect to a pixel block, or if expansion will in fact be the result. Such systems can then avoid storing an expanded version of the pixel blocks within the memory along with an indication that the block is uncompressed. In addition to this, it may be determined whether memory block fetching renders compression less-beneficial. If the minimum memory block fetch is 64 bits and the compression algorithm compresses the parameter data from 92 bits to 70 bits, no real bandwidth savings is realized as two block fetches will still be required. As such, the decision as to whether or not to compress a parameter data set may also be based on memory access granularity.

As was stated earlier, the spatial orientation of the pixel block with respect to "column" slope computation is arbitrary. Thus, reference pixels may be chosen in any one of the four corners and the first stage of compression into a column-wise differential slope representation may in fact be a transformation into a row-wise differential slope representation. It should also be apparent to one of ordinary skill in the art that other types of encoding schemes such as Huffman encoding and the like could be used to encode a limited set of values for each of the differential slopes within the output format representation. The two-bit encoding described herein is only one example of such an encoding scheme. Further, for large blocks it may be advantageous to use the four corner pixels as reference pixels and work towards the center of the block in a manner that reflects an extrapolation of the use of two reference pixels and working towards a line between the two reference pixels.

It should be understood that the implementation of variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for compressing parameter values for pixels of a pixel block, comprising:

translating parameter values for the pixel block into a column-wise differential slope representation;

translating the column-wise differential slope representation into a planar differential slope representation; and generating an output format representation of the parameter values for the pixel block from the planar differential slope representation.

2. The method of claim 1, wherein the parameter values are Z values for the pixels of the pixel block.

3. The method of claim 1 wherein the column-wise differential slope representation includes a plurality of pixel point values, a plurality of column slopes, and a plurality of column slope differentials, wherein each column slope differential represents a column slope deviation at a pixel point not represented by the plurality of pixel point values and the plurality of column slopes;

wherein the planar slope representation reduces the plurality of pixel point values and the plurality of column slopes to a reference pixel value, a reference column slope, a reference row slope, and a plurality of row slope differentials; and wherein the output format representation orders the reference pixel value, the reference column slope, the reference row slope, the plurality of row slope differentials, and the plurality of column slope differentials in a predetermined pattern.

4. The method of claim 3 further comprises representing column slope differentials and row slope differentials in the output format representation using a first number of encoding bits, wherein when the first number of encoding bits is inadequate for representing one of the differentials, an encoding value corresponding to an escape is used within a position in the output format representation corresponding to the differential, wherein the escape indicates that an escape value for the differential is included in the output format representation, wherein the escape value is encoded by a second number of bits adequate to fully encode the differential.

5. The method of claim 2, wherein the second number for the pixel block is determined based on a number of bits adequate to fully encode a largest differential for which an escape value encoding is required within the pixel block, wherein a first set of configuration bits in the output format representation indicates the second number.

6. The method of claim 5, wherein the first number is two such that the first number of encoding bits encodes four states, wherein the four states include a zero differential, a positive one differential, a negative one differential, and the encoding value corresponding to the escape.

7. The method of claim 5 further comprises representing the reference column slope and the reference row slope using a third number of bits, wherein the third number is determined based on a number of bits adequate to fully encode a largest slope of the reference column slope and the reference row slope, wherein a second set of configuration bits in the output format representation indicates the third number.

8. A method for double edge compression of parameter values for pixels of a pixel block, comprising:
performing a first edge compression, wherein the first edge compression includes:
translating parameter values for the pixel block into a first column-wise differential slope representation, wherein the first column-wise differential slope representation includes a first plurality of pixel point values along a first edge of the pixel block, a first plurality of column slopes, and a first plurality of column slope differentials, wherein each column slope differential of the first plurality of column slope differentials represents a column slope deviation at a pixel point not represented by the first plurality of pixel point values and the first plurality of column slopes; and
translating the first column-wise differential slope representation into a first planar differential slope representation, wherein the first planar slope representation reduces the first plurality of pixel point values and the first plurality of column slopes to a first reference pixel value, a first reference column slope, a first reference row slope, and a first plurality of row slope differentials;
performing a second edge compression, wherein the second edge compression includes:
translating at least a portion of the parameter values for the pixel block into a second column-wise differential slope representation, wherein the second column-wise differential slope representation includes a second plurality of pixel point values along a second edge of the pixel block, a second plurality of column slopes, and a second plurality of column slope differentials, wherein each column slope differential of the second plurality of column slope differentials represents a column slope deviation at a pixel point not represented by the second plurality of pixel point values and the second plurality of column slopes; and
translating the second column-wise differential slope representation into a second planar differential slope representation, wherein the second planar slope representation reduces the second plurality of pixel point values and the second plurality of column slopes to a second reference pixel value, a second reference column slope, a second reference row slope, and a second plurality of row slope differentials; and
generating an output format representation for the pixel block, wherein generating the output format representation includes:

when a predetermined breakpoint pattern in one of the first and second pluralities of column slope differentials is detected, generating a double edge output format representation of the parameter values for the first and second column-wise differential column slope representations, wherein the double edge output format representation orders the first and second reference pixel values, the first and second reference row slopes, the first and second reference column slopes, portions of each of the first and second pluralities of row slope differentials, portions of the first and second pluralities of column slope differentials, and a breakpoint indication in a predetermined double edge order, wherein the portions of the first and second pluralities of column and row slope differentials included in the double edge output format representation are determined based on location of the predetermined breakpoint pattern in the pixel block, wherein the breakpoint indication describes the portions of the first and second pluralities of column and row slope differentials; and
when the predetermined breakpoint pattern is not detected, generating a single edge output format representation of the parameter values for the pixel block, wherein the single edge output format representation orders the first reference pixel value, the first reference column slope, the first reference row slope, the first plurality of row slope differentials, and the first plurality of column slope differentials in a predetermined single edge order.

9. The method of claim 8 wherein generating an output format representation for the pixel block further comprises including an indication that compression for the pixel block is one of single edge compression and double edge compression.

10. The method of claim 9, wherein detecting the predetermined breakpoint pattern further comprises determining a slope discontinuity within one of the first and second pluralities of column slope differentials.

11. The method of claim 9, wherein the parameter values for the pixel block are Z values for the pixel block.

12. The method of claim 10 further comprises representing column slope differentials and row slope differentials in the output format representation using a first number of encoding bits, wherein when the first number of encoding bits is inadequate for representing one of the differentials, an encoding value corresponding to an escape is used within a position in the output format representation corresponding to the differential, wherein the escape indicates that an escape value for the differential is included in the output format representation, wherein the escape value is encoded by a second number of bits adequate to fully encode the differential.

13. The method of claim 12, wherein the second number is determined based on a number of bits adequate to fully encode a largest differential for which an escape value encoding is required within the pixel block, wherein a first set of configuration bits in the output format representation indicates the second number.

14. The method of claim 13, wherein the first number is two such that the first number of encoding bits encodes four states, wherein the four states include a zero differential, a positive one differential, a negative one differential, and the encoding value corresponding to the escape.

15. The method of claim 13 further comprises representing reference column slopes and reference row slopes using a third number of bits, wherein the third number is determined base on a number of bits adequate to fully encode a largest slope of the first and second reference column slopes and the first and second reference row slopes, wherein a second set of configuration bits in the output format representation indicates the third number.

16. A method for compressing parameter values for pixels in a display frame, wherein each pixel within the display frame has a corresponding parameter value, comprising:

grouping pixels of the display frame into a plurality of pixel blocks;

for at least one pixel block of the plurality of pixel blocks:

translating parameter values for the pixel block into a column-wise differential slope representation, wherein the column-wise differential slope representation includes a plurality of pixel point values, a plurality of column slopes, and a plurality of column slope differentials, wherein each column slope differential represents a column slope deviation at a pixel point not represented by the plurality of pixel point values and the plurality of column slopes;

translating the column-wise differential slope representation into a planar differential slope representation, wherein the planar slope representation reduces the plurality of pixel point values and the plurality of column slopes to a reference pixel value, a reference column slope, a reference row slope, and a plurality of row slope differentials; and generating an output format representation of the parameter values for the pixel block from the planar differential slope representation, wherein the output format representation orders the reference pixel value, the reference column slope, the reference row slope, the plurality of row slope differentials, and the plurality of column slope differentials in a predetermined pattern selecting one of the four corner pixels as a first reference pixel for the first pixel block.

17. The method of claim 16 further comprises storing the output format representation of the at least one pixel block in a memory.

18. The method of claim 16 further comprises:

retrieving the output format representation of the at least one pixel block from the memory;

reconstructing the planar differential slope representation for the pixel block from the output format representation;

reconstructing the column-wise differential slope representation for the pixel block from the planar differential slope representation; and recovering the parameter values for the pixels in the pixel block from the column-wise differential slope representation.

19. The method of claim 18, wherein the parameter values for the pixels are Z values for the pixels.

20. A pixel parameter compression processor for compressing parameter values for pixels of a pixel block, comprising:

a processing module; and memory operably coupled to the processing module, wherein the memory stores operating instructions that, when executed by the processing module, cause the processing module to perform the functions of:

translating parameter values for the pixel block into a column-wise differential slope representation;

translating the column-wise differential slope representation into a planar differential slope representation; and generating an output format representation of the parameter values for the pixel block from the planar differential slope representation.

21. The processor of claim 20 wherein the column-wise differential slope representation includes a plurality of pixel point values, a plurality of column slopes, and a plurality of column slope differentials, wherein each column slope differential represents a column slope deviation at a pixel point not represented by the plurality of pixel point values and the plurality of column slopes;

wherein the planar slope representation reduces the plurality of pixel point values and the plurality of column slopes to a reference pixel value, a reference column slope, a reference row slope, and a plurality of row slope differentials; and wherein the output format representation orders the reference pixel value, the reference column slope, the reference row slope, the plurality of row slope differentials, and the plurality of column slope differentials in a predetermined pattern.

22. The method of claim 21 wherein the parameter values are Z values for the pixels of the pixel block.

23. The processor of claim 22, wherein the memory includes operating instructions such that the processing module represents column slope differentials and row slope differentials in the output format representation using a first number of encoding bits, wherein when the first number of encoding bits is inadequate for representing one of the differentials, an encoding value corresponding to an escape is used within a position in the output format representation corresponding to the differential, wherein the escape indicates that an escape value for the differential is included in the output format representation, wherein the escape value is encoded by a second number of bits adequate to fully encode the differential.

24. The processor of claim 23, wherein the second number is determined based on a number of bits adequate to fully encode a largest differential for which an escape value encoding is required within the pixel block, wherein a first set of configuration bits in the output format representation indicates the second number.

25. The processor of claim 24, wherein the first number is two such that the first number of encoding bits encodes four states, wherein the four states include a zero differential, a positive one differential, a negative one differential, and the encoding value corresponding to the escape.

26. The processor of claim 24, wherein the memory includes operating instructions such that the processing module represents the reference column slope and the reference row slope using a third number of bits, wherein the third number is determined based on a number of bits adequate to fully encode a largest slope of the reference column slope and the reference row slope, wherein a second set of configuration bits in the output format representation indicates the third number.

27. A pixel parameter compression processor for compressing parameter values for pixels of a pixel block, comprising:

a processing module; and memory operably coupled to the processing module, wherein the memory stores operating instructions that, when executed by the processing module, cause the processing module to perform the functions of:

performing a first edge compression, wherein the first edge compression includes:

translating parameter values for the pixel block into a first column-wise differential slope representation, wherein the first column-wise differential slope representation includes a first plurality of pixel point values along a first edge of the pixel block, a first plurality of column slopes, and a first plurality of column slope differentials, wherein each column slope differential of the first plurality of column slope differentials represents a column slope deviation at a pixel point not represented by the first plurality of pixel point values and the first plurality of column slopes; and translating the first column-wise differential slope representation into a first planar differential slope representation, wherein the first planar slope representation reduces the first plurality of pixel point values and the first plurality of column slopes to a first reference pixel value, a first reference column slope, a first reference row slope, and a first plurality of row slope differentials;

performing a second edge compression, wherein the second edge compression includes:

translating at least a portion of the parameter values for the pixel block into a second column-wise differential slope representation, wherein the second column-wise differential slope representation includes a second plurality of pixel point values along a second edge of the pixel block, a second plurality of column slopes, and a second plurality of column slope differentials, wherein each column slope differential of the second plurality of column slope differentials represents a column slope deviation at a pixel point not represented by the second plurality of pixel point values and the second plurality of column slopes; and translating the second column-wise differential slope representation into a second planar differential slope representation, wherein the second planar slope representation reduces the second plurality of pixel point values and the second plurality of column slopes to a second reference pixel value, a second reference column slope, a second reference row slope, and a second plurality of row slope differentials; and generating an output format representation for the pixel block, wherein generating the output format representation includes:

when a predetermined breakpoint pattern in one of the first and second pluralities of column slope differentials is detected, generating a double edge output format representation of the parameter values for the first and second column-wise differential column slope representations, wherein the double edge output format representation orders the first and second reference pixel values, the first and second reference row slopes, the first and second reference column slopes, portions of each of the first and second pluralities of row slope differentials, portions of the first and second pluralities of column slope differentials in a predetermined pattern, and a breakpoint indication, wherein the included portions, which include the portions of the first and second pluralities of column and row slope differentials included in the double edge output format representation, are determined based on location of the predetermined breakpoint pattern in the pixel block, wherein the breakpoint indication describes included portions; and when the predetermined breakpoint pattern is not detected, generating a single edge output format representation of the parameter values for the pixel block, wherein the single edge output format representation orders the first reference pixel value, the first reference column slope, the first reference row slope, the first plurality of row slope differentials, and the first plurality of column slope differentials in a predetermined order.

28. The processor of claim 27, wherein the memory includes instructions such that the processing module generates the output format representation for the pixel block such that the output format representation includes an indication that indicates compression for the pixel block is one of single edge compression and double edge compression.

29. The processor of claim 28, wherein the memory includes instructions such that the processor detects the predetermined breakpoint pattern by determining a slope discontinuity along one of the first and second pluralities of column slope differentials.

30. The processor of claim 29, wherein the parameter values for the pixel block are Z values for the pixel block.

31. The processor of claim 30, wherein the memory includes instructions such that the processor represents column slope differentials and row slope differentials in the output format representation using a first number of encoding bits, wherein when the first number of encoding bits is inadequate for representing one of the differentials, an encoding value corresponding to an escape is used within a position in the output format representation corresponding to the differential, wherein the escape indicates that an escape value for the differential is included in the output format representation, wherein the escape value is encoded by a second number of bits adequate to fully encode the differential.

32. The processor of claim 31, wherein the second number is determined based on a number of bits adequate to fully encode a largest differential for which an escape value encoding is required within the pixel block, wherein a first set of configuration bits in the output format representation indicates the second number.

33. The processor of claim 32, wherein the first number is two such that the first number of encoding bits encode four states, wherein the four states include a zero differential, a positive one differential, a negative one differential, and the encoding value corresponding to the escape.

34. The processor of claim 32, wherein the memory includes instructions such that the processing module represents reference column slopes and reference row slopes using a third number of bits, wherein the third number is determined base on a number of bits adequate to fully encode a largest slope of the first and second reference column slopes and the first and second reference row slopes, wherein a second set of configuration bits in the output format representation indicates the third number.

35. A pixel parameter compression processor for compressing parameter values for pixels in a display frame, wherein each pixel within the display frame has a corresponding parameter value, comprising:

a processing module; and memory operably coupled to the processing module, wherein the memory stores operating instructions that, when executed by the processing module, cause the processing module to perform the functions of:

grouping pixels of the display frame into a plurality of pixel blocks;

for at least one pixel block of the plurality of pixel blocks:

translating parameter values for the pixel block into a column-wise differential slope representation, wherein the column-wise differential slope representation includes a plurality of pixel point values, a plurality of column slopes, and a plurality of column slope differentials, wherein each column slope differential represents a column slope deviation at a pixel point not represented by the plurality of pixel point values and the plurality of column slopes;

translating the column-wise differential slope representation into a planar differential slope representation, wherein the planar slope representation reduces the plurality of pixel point values and the plurality of column slopes to a reference pixel value, a reference column slope, a reference row slope, and a plurality of row slope differentials; and generating an output format representation of the parameter values for the pixel block from the planar differential slope representation, wherein the output format representation orders the reference pixel value, the reference column slope, the reference row slope, the plurality of row slope differentials, and the plurality of column slope differentials in a predetermined pattern selecting one of the four corner pixels as a first reference pixel for the first pixel block.

36. The processor of claim 35 wherein the memory includes instructions such that the processing module stores the output format representation of the at least one pixel block in a pixel memory.

37. The processor of claim 36 wherein the memory includes instructions such that the processing module performs additional functions including:

retrieving the output format representation of the at least one pixel block from the memory;

reconstructing the planar differential slope representation for the pixel block from the output format representation;

reconstructing the column-wise differential slope representation for the pixel block from the planar differential slope representation; and recovering the parameter values for the pixels in the pixel block from the column-wise differential slope representation.

38. The processor of claim 37, wherein the parameter values for the pixels are Z values for the pixels.

* * * * *